United States Patent
Mekis et al.

(10) Patent No.: US 9,910,232 B2
(45) Date of Patent: Mar. 6, 2018

(54) METHOD AND SYSTEM FOR A CHIP-ON-WAFER-ON-SUBSTRATE ASSEMBLY

(71) Applicant: Luxtera, Inc., Carlsbad, CA (US)

(72) Inventors: Attila Mekis, Carlsbad, CA (US); Peter De Dobbelaere, San Diego, CA (US); Gianlorenzo Masini, Carlsbad, CA (US); Yannick De Koninck, San Diego, CA (US); Thierry Pinguet, Marysville, WA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 15/299,098

(22) Filed: Oct. 20, 2016

(65) Prior Publication Data
US 2017/0115458 A1    Apr. 27, 2017

Related U.S. Application Data

(60) Provisional application No. 62/285,173, filed on Oct. 21, 2015.

(51) Int. Cl.
*H04B 10/50*    (2013.01)
*H04B 10/80*    (2013.01)
(Continued)

(52) U.S. Cl.
CPC ........... *G02B 6/428* (2013.01); *G02B 6/4206* (2013.01); *G02B 6/4208* (2013.01);
(Continued)

(58) Field of Classification Search
CPC .... G02B 6/428; G02B 6/4206; G02B 6/4208; H04B 10/801; H04B 10/501
See application file for complete search history.

(56) References Cited

U.S. PATENT DOCUMENTS 9,304,268 B2 *   4/2016   Castagna ............. G02B 6/4214
2010/0006784 A1   1/2010   Mack et al.
(Continued)

FOREIGN PATENT DOCUMENTS

JP    2013243649 A    12/2013

OTHER PUBLICATIONS

Chou et al., "Modeling, design, and fabrication of ultra-high bandwidth 3D Glass Photonics (3DGP) in glass interposers," 2013 IEEE 63rd Electronic Components and Technology Conference, Las Vegas, NV, 2013, pp. 286-291. doi: 10.1109/ECTC.2013.6575585; URL: http://ieeexplore.ieee.org/stamp/stamp.jsp?tp=&arnumber=6575585&isnumber=6575533.*
(Continued)

*Primary Examiner* — Nathan Curs
(74) *Attorney, Agent, or Firm* — McAndrews, Held & Malloy

(57) ABSTRACT

Methods and systems for a chip-on-wafer-on-substrate assembly are disclosed and may include in an integrated optical communication system comprising an electronics die and a substrate. The electronics die is bonded to a first surface of a photonic interposer and the substrate is coupled to a second surface of the photonic interposer opposite to the first surface. An optical fiber and a light source assembly are coupled to the second surface of the interposer in one or more cavities formed in the substrate. The integrated optical communication system is operable to receive a continuous wave (CW) optical signal in the photonic interposer from the light source assembly; and communicate a modulated optical signal to the optical fiber from said photonic interposer. A mold compound may be on the first surface of the interposer and in contact with the electronics die. The received CW optical signal may be coupled to an optical
(Continued)

waveguide in the photonic interposer using a grating coupler.

20 Claims, 12 Drawing Sheets

(51) Int. Cl.
*G02B 6/42* (2006.01)
*G02B 6/34* (2006.01)
*G02B 6/38* (2006.01)
*G02B 6/30* (2006.01)
*G02B 6/124* (2006.01)

(52) U.S. Cl.
CPC ......... *H04B 10/501* (2013.01); *H04B 10/801* (2013.01); *G02B 6/124* (2013.01); *G02B 6/30* (2013.01); *G02B 6/34* (2013.01); *G02B 6/3897* (2013.01); *G02B 6/424* (2013.01); *G02B 6/4214* (2013.01); *G02B 6/4239* (2013.01); *G02B 6/4245* (2013.01); *G02B 6/4255* (2013.01)

(56) References Cited

U.S. PATENT DOCUMENTS

| | | | | |
|---|---|---|---|---|
| 2013/0177274 A1* | 7/2013 | Kosenko | ............... | G02B 6/3628 385/14 |
| 2014/0010498 A1* | 1/2014 | Verslegers | ........... | G02B 5/1861 385/37 |
| 2014/0286647 A1* | 9/2014 | Ayazi | ...................... | G02F 1/025 398/139 |
| 2014/0374629 A1* | 12/2014 | Huang | ................. | H04B 10/802 250/551 |
| 2015/0358084 A1* | 12/2015 | Lesea | ................... | H04B 10/501 398/189 |
| 2016/0142155 A1* | 5/2016 | Kim | ....................... | H04B 10/40 398/141 |

OTHER PUBLICATIONS

EESR dated Mar. 21, 2017 for European Patent Application No. 16195157.9.

\* cited by examiner

METHOD AND SYSTEM FOR A CHIP-ON-WAFER-ON-SUBSTRATE ASSEMBLY

CROSS-REFERENCE TO RELATED APPLICATIONS/INCORPORATION BY REFERENCE

This application makes reference to and claims priority to U.S. Provisional Application 62/285,173, filed on Oct. 21, 2015. Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD

Certain embodiments of the disclosure relate to semiconductor processing. More specifically, certain embodiments of the disclosure relate to a method and system for a chip-on-wafer-on-substrate assembly.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for a chip-on-wafer-on-substrate assembly, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Figure 1:
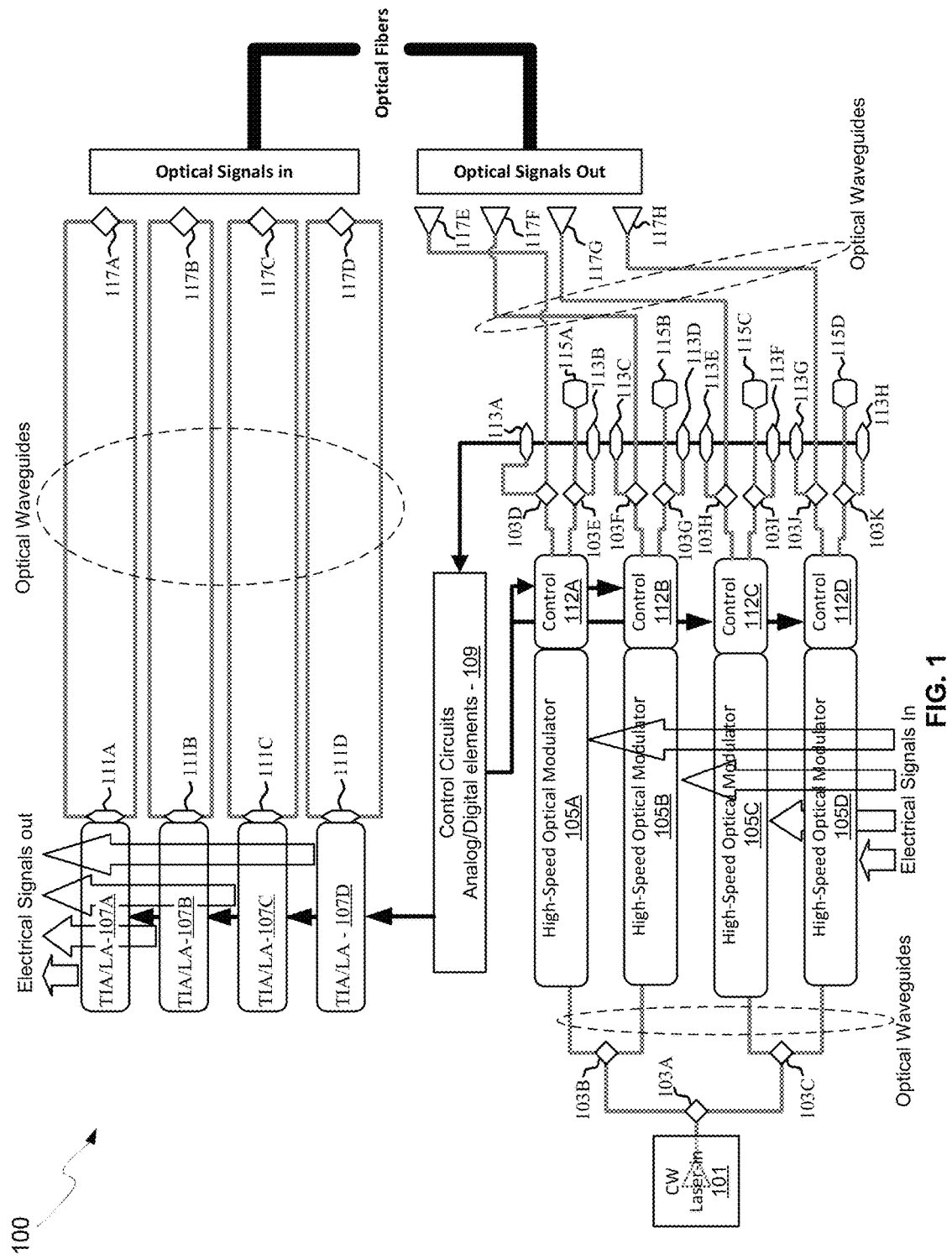
FIG. 1 is a block diagram of a CMOS transceiver, in accordance with an embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain aspects of the disclosure may be found in a method and system for a chip-on-wafer-on-substrate assembly. Exemplary aspects of the disclosure may comprise an integrated optical communication system comprising an electronics die bonded to a first surface of a photonic interposer; and a substrate coupled to a second surface of the photonic interposer opposite to the first surface. An optical fiber and a light source assembly are coupled to the second surface of the interposer in one or more cavities formed in the substrate. The integrated optical communication system is operable to receive a continuous wave (CW) optical signal in the photonic interposer from the light source assembly, and communicate a modulated optical signal to the optical fiber from said photonic interposer. A mold compound may be on the first surface of the interposer and in contact with the electronics die. The received CW optical signal may be coupled to an optical waveguide in the photonic interposer using a grating coupler. A dielectric/metal backend may be on the first surface of the interposer. A metal reflector may be in the dielectric/metal backend and may reflect light back into the grating coupler. One or more anti-reflection coatings may be between the optical fiber and the grating coupler. The photonic interposer may include through-silicon-vias (TSVs) that electrically couple the electronics die to the substrate. The substrate may be a printed circuit board. Dams may be adjacent to the optical fiber and the light source assembly on the second surface of the photonic interposer. The modulated optical signal may be generated utilizing a modulator in the photonic interposer and the received CW optical signal.

FIG. 1 is a block diagram of a CMOS transceiver utilizing a photonic interposer, in accordance with an embodiment of the disclosure. Referring to FIG. 1, there is shown optoelectronic devices in a transceiver 100 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There are also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in a CMOS interposer chip, with the optical waveguides being indicated in FIG. 1 by the dashed ovals. Optical and optoelectronic devices are integrated in a silicon photonic interposer while electronic devices are integrated into one or more CMOS electronics chips that are coupled to the silicon photonic interposer.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the silicon photonic interposer. The grating couplers 117A-117D may be utilized to couple light received from optical fibers into the silicon photonic interposer, and may comprise polarization independent grating couplers. The grating couplers 117E-117H may be utilized to couple light from the silicon photonic interposer into optical fibers. The optical fibers may be epoxied, for example, to the CMOS chip, and may be aligned at an angle from normal to the surface of the silicon photonic interposer to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D, the analog and digital control circuits 109, and the control sections 112A-112D may be integrated on one or more electronics CMOS chips that may be bonded to the silicon photonic interposer via copper pillars. In this manner, electronic and photonic performance may be optimized independently on different CMOS nodes. The TIA/LAs 107A-107D may then communicate electrical signals to other circuitry on the electronics chip.

The TIA/LAs 107A-107D may comprise narrowband, non-linear optoelectronic receiver circuitry. Accordingly, the narrowband receiver front-end may be followed by a restorer circuit, such as, for example, a non-return to zero (NRZ) level restorer circuit. A restorer circuit limits the bandwidth of the optical receiver in order to decrease the integrated noise, thereby increasing the signal to noise ratio. An NRZ level restorer may be used to convert the resulting data pulses back into NRZ data.

The control sections 112A-112D comprise electronic circuitry that enable modulation of the CW laser signal received from the taps 103A-103C. The high speed optical modulators 105A-105D require high-speed electrical signals to modulate the refractive index in respective branches of a Mach-Zehnder interferometer (MZI), for example.

In an embodiment of the disclosure, the integration of all optical and optoelectronic devices required for a transceiver into a single silicon photonic interposer, and of all required electronic devices on one or more CMOS electronics chips, enables optimized performance of the resulting single hybrid package. In this manner, electronic device performance may be optimized independently of the optimization of photonic devices in the silicon photonic interposer. For example, the electronic CMOS chip may be optimized on a 32 nm CMOS process, while the silicon photonic interposer may be optimized on a 130 nm CMOS node. The electronics devices may be placed on the electronics chip such that they are located directly above their associated photonics devices when bonded to the silicon photonic interposer. For example, the control sections 112A-112D may be located on an electronics CMOS chip such that they lie directly above the high-speed optical modulators 105A-105B and can be coupled by low parasitic copper pillars.

In an exemplary embodiment, the hybrid transceiver 100 comprises four optoelectronic transceivers with one optical source, and enables communication of optical signals vertically to and from the surface of the silicon photonic interposer, thereby enabling the use of CMOS processes and structures, including a CMOS guard ring. The silicon photonic interposer may comprise both active devices, such as photodetectors and modulators, and passive devices, such as waveguides, splitters, combiners, and grating couplers, thereby enabling photonic circuits to be integrated on CMOS chips. The interposer may be coupled to a substrate, as described further with respect to FIGS. 2A-7C.

Figure 2A:
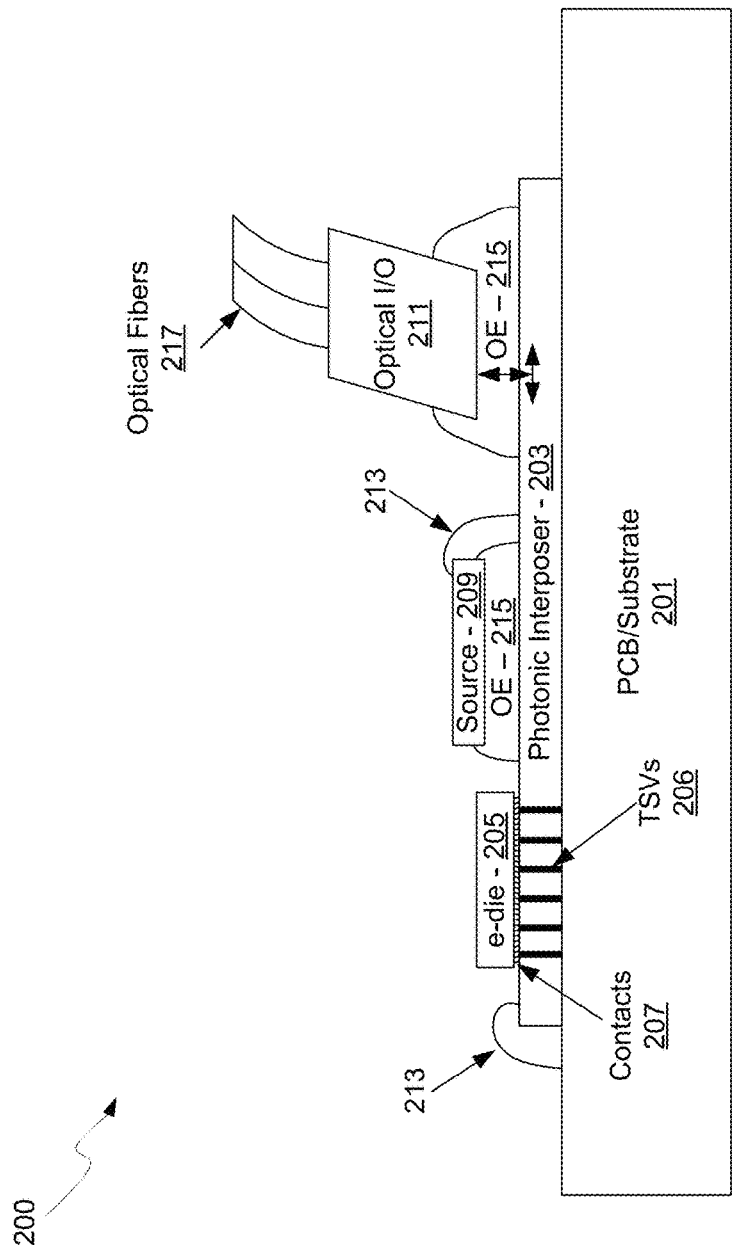
FIG. 2A is a schematic illustrating an example optical transceiver including a photonic interposer, in accordance with an embodiment of the disclosure.

FIG. 2A is a schematic illustrating an example optical transceiver including a photonic interposer, in accordance with an embodiment of the disclosure. Referring to FIG. 2A, there is shown a photonic transceiver 200 comprising a printed circuit board (PCB)/substrate 201, a silicon photonic interposer 203, an electronic CMOS die 205, through silicon vias (TSVs) 206, contacts 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. The functionalities supported by the silicon photonic interposer 203 may comprise photo-detection, optical modulation, optical routing, and optical interfaces for high-speed I/O and optical power delivery.

The silicon photonic interposer 203 may also comprise contacts 207 for coupling the electronics die 205 to the silicon photonic interposer 203, as well as grating couplers for coupling light into the die from the optical source module 209 and into/out of the die via the optical I/O 211. The contacts 207 may comprises microbumps or copper pillars, for example. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the contacts 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The contacts 207 may comprise linear or 2D arrays of microbumps or metal pillars to provide electrical contact between the silicon photonic interposer 203 and the electronics die 205. For example, the contacts 207 may provide electrical contact between photodetectors in the silicon photonic interposer 203 and associated receiver circuitry in the electronics die 205. In addition, the contacts 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another exemplary scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical surface to be coupled to the silicon photonic interposer 203, such as by the optical epoxy 215.

In operation, continuous-wave (CW) optical signals may be communicated into the silicon photonic interposer 203 from the optical source module 209 via one or more grating couplers in the silicon photonic interposer 203. Photonic devices in the silicon photonic interposer 203 may then process the received optical signal. For example, one or more optical modulators may modulate the CW signal based on electrical signals received from the electronics die 205. Electrical signals may be received from the electronics die 205 via the contacts 207. In an example scenario, the contacts 207 may comprise copper pillars, for example, providing low-resistance contacts for high speed performance. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. In this manner, high-speed electrical signals generated in the electronics die 205 may be utilized to modulate a CW optical signal and subsequently communicated out of the silicon photonic interposer 203 via the optical fibers 217.

Similarly, modulated optical signals may be received in the silicon photonic interposer 203 via the optical fibers 217 and the optical I/O 211. The received optical signals may be communicated within the silicon photonic interposer 203 via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance contacts 207.

The hybrid integration of CMOS electronics die on silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, optical interconnect between multiple electronic die, i.e. chip-to-chip interconnect, is enabled by the silicon photonic interposer 203, where transceiver functions are supported by the combined electronic die and interposer and the associated optical routing on the silicon photonic interposer die 203. The disclosure is not limited to the arrangement shown in FIG. 2A. Accordingly, various stacking arrangements are possible. For example, photonic interposers may be sandwiched between electronic chips and stacks of interposers/electronic chips may be configured resulting in a 3-dimensional structure.

The photonic interposer 203 comprises through-silicon vias (TSVs) 206 that enable electrical signals to be connected to the electronic die 205 that is mounted on the top of the interposer 203. The fabrication process may necessitate backgrinding the photonic interposer 203 to reduce the silicon substrate thickness and enable the TSV process. As the substrate thickness after backgrinding is on the order of only 100 jam, a molding material is dispensed on the top of the chip assembly in order to stabilize it mechanically. The chipset assembly is in turn mounted on another substrate using bumping as shown in FIG. 4.

Figure 2B:
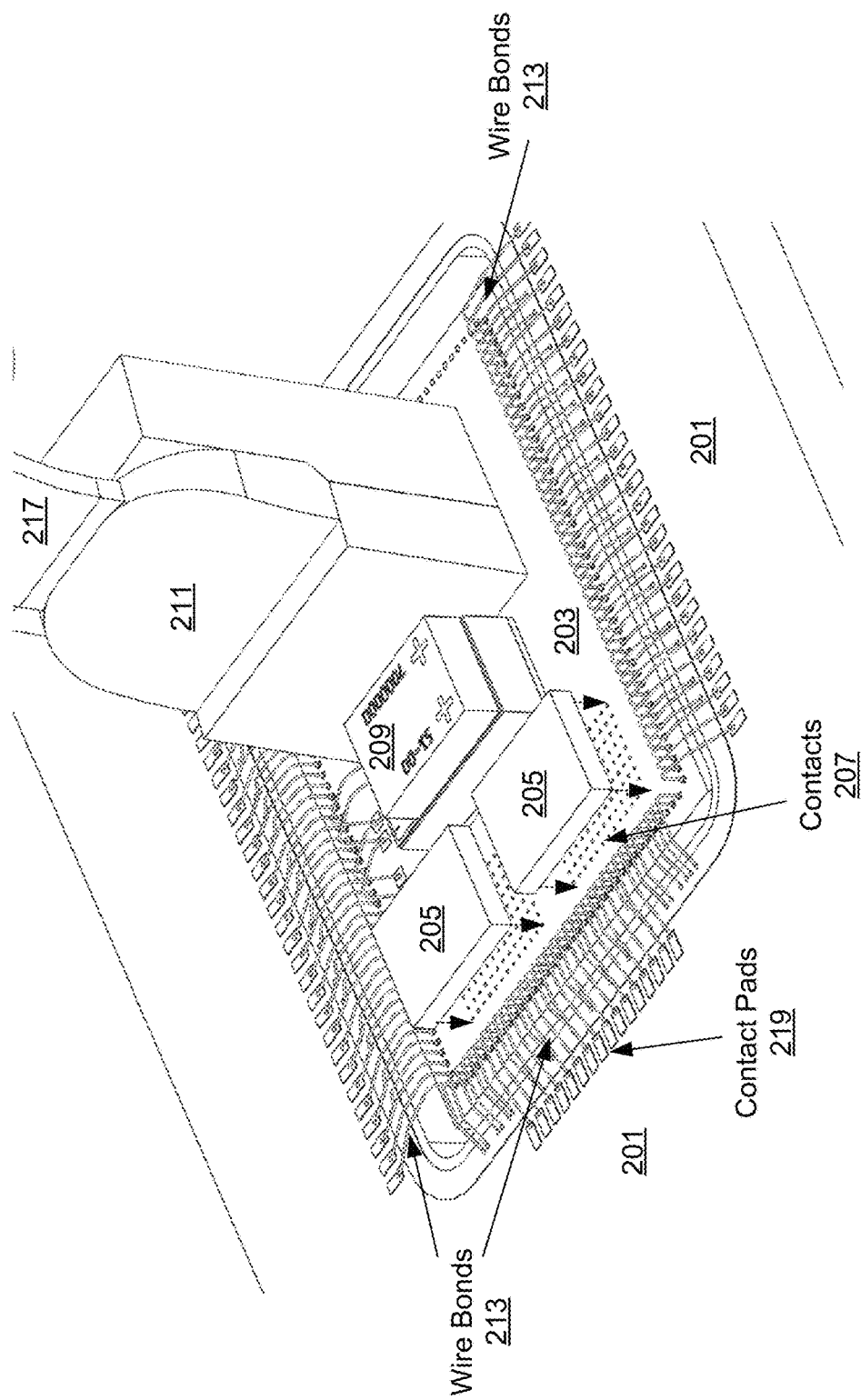
FIG. 2B is a perspective view of a photonic transceiver, in accordance with an embodiment of the disclosure.

FIG. 2B is a perspective view of a hybrid integration photonic transceiver, in accordance with an embodiment of the disclosure. Referring to FIG. 2B, there is shown the PCB/substrate 201, the silicon photonic interposer 203, electronics die 205, the contacts 207, the optical source assembly 209, the optical I/O 211, wire bonds 213, optical fibers 217, and contact pads 219.

The electronics die 205 are shown prior to bonding to the surface of the silicon photonic interposer 203 via the contacts 207, as illustrated by the dashed arrows below each die. While two electronics die 205 are shown in FIG. 2B, it should be noted that the disclosure is not so limited. Accordingly, any number of electronics die may be coupled to the silicon photonic interposer 203 depending on the number of transceivers, the particular CMOS node utilized, thermal conductance, and space limitations, for example.

In another exemplary embodiment, the optical source assembly 209 may be located remotely and one or more optical fibers may be utilized to couple the optical source signal into the silicon photonic interposer 203 via grating couplers, for example.

In an exemplary embodiment, electronic functions may be integrated into the electronics die 205 and photonics circuitry may be integrated into the silicon photonic interposer 203 utilizing independent CMOS processes, with the silicon photonic interposer 203 bonded to the substrate 201. The electronics die 205 may comprise electronic devices associated with photonic devices in the silicon photonic interposer 203, thereby minimizing electrical path lengths while still allowing independent performance optimization of electronic and photonic devices. For example, the CMOS processes that result in the highest electronics performance, such as the fastest switching speed, may not be optimum for CMOS photonics performance. Similarly, different technologies may be incorporated in the different die. For example, SiGe CMOS processes may be used for photonic devices such as photodetectors, and 32 nm CMOS processes may be used for electronic devices on the electronics die 205.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203, with the photonics circuitry in the silicon photonic interposer 203 processing the CW signal. For example, the CW signal may be coupled into the silicon photonic interposer 203 via grating couplers, communicated to various locations on the die via optical waveguides, modulated by Mach-Zehnder interferometer (MZI) modulators, and communicated out of the silicon photonic interposer 203 into optical fibers. In this manner, the hybrid integration of a plurality of high performance optical transceivers is enabled in CMOS processes.

In another exemplary scenario, the silicon photonic interposer 203 may provide optical routing between electronics die. For example, the electronics die 205 may comprise a plurality of processors and memory die. Electrical signals from the electronics die 205 may be communicated to modulators on the silicon photonic interposer 203 via copper pillars, for example, and converted to optical signals for routing to another electronics die via optical waveguides before being converted back to electronic signals utilizing photodetectors. In this manner, very high-speed coupling is enabled for a plurality of electronics die, reducing the memory requirements on processor chips, for example.

Figure 2C:
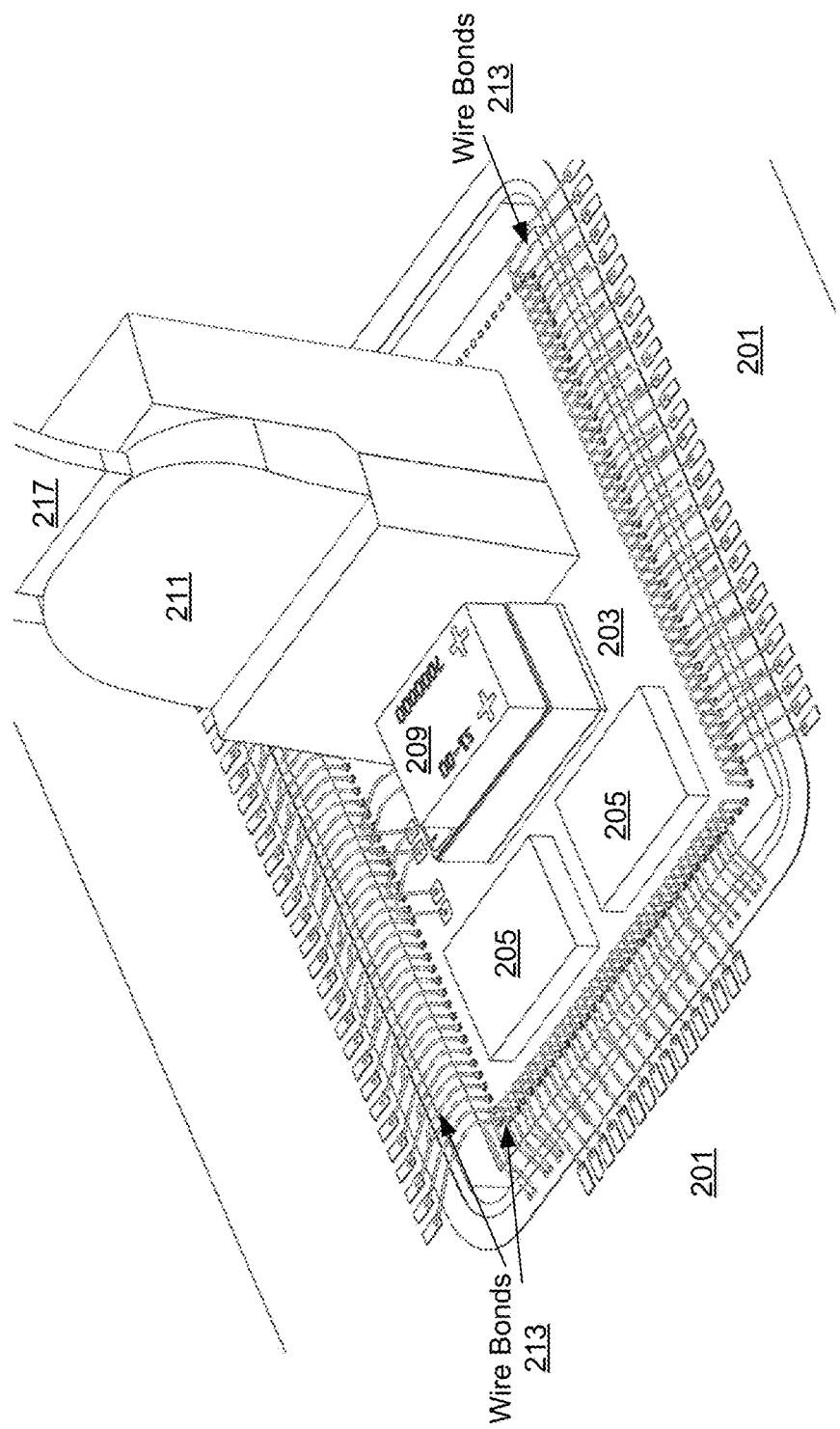
FIG. 2C is a perspective view of a photonic interposer with two coupled electronics die, in accordance with an embodiment of the disclosure

FIG. 2C is a perspective view of a photonic interposer with two coupled electronics die, in accordance with an embodiment of the disclosure. Referring to FIG. 2C, there is shown the PCB/substrate 201, the silicon photonic interposer 203, electronics die 205, the optical source assembly 209, the optical I/O 211, wire bonds 213, and optical fibers 217.

The electronics die 205 are shown bonded to the surface of the silicon photonic interposer 203 via Cu pillars, for example. While two electronics die 205 are shown in FIG. 2C, it should again be noted that the disclosure is not necessarily so limited. Accordingly, any number of electronics die may be coupled to the silicon photonic interposer 203 depending on number of transceivers, the particular CMOS node utilized, thermal conductance, and space limitations, for example.

In an exemplary embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. Different technologies may be incorporated in the different die. For example, SiGe CMOS processes may be used for photonic devices in the silicon photonic interposer 203, such as photodetectors and modulators, and 32 nm CMOS processes may be used for electronic devices on the electronics die 205.

In another exemplary scenario, one of the electronics die 205 may comprise a conventional application specific integrated circuit (ASIC) and a second electronics die 205 may comprise a driver die with circuitry for driving the photonics devices in the silicon photonic interposer 203. Accordingly, the driver die may receive electronic signals from the ASIC via the silicon photonic interposer 203 and use the received signals to subsequently drive photonic devices in the silicon photonic interposer 203. In this manner, the second die provides the driver circuitry as opposed to the integrating driver circuitry in the ASIC. This may allow existing ASIC designs to be integrated with the silicon photonic interposer 203 without any modification to the ASIC I/O circuitry.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203 and biased by voltages coupled to the optical source assembly 209 via wire bonds 213. Photonics circuitry in the silicon photonic interposer 203 may then process the CW signal. For example, the CW signal may be coupled into the silicon photonic interposer 203 via grating couplers, communicated to various locations on the die via optical waveguides, modulated by MZI modulators, and communicated out of the silicon photonic interposer 203 into the optical fibers 217 via the optical I/O 211.

Heat may be conducted away from the die via the PCB/substrate 201. In this manner, the silicon photonic interposer and electronics die 205 may enable a plurality of high performance optical transceivers using separately optimized CMOS processes. Similarly, the silicon photonic interposer 203 may enable high-speed interconnects between electronic circuits in the electronics die 205, such as between processor cores and memory, for example.

In integrated optical circuits, surface-emitting light couplers are preferred over edge-coupling solutions. Edge-coupling light from an optical fiber to a planar waveguide circuit typically requires complex, three-dimensional integrated mode converters; polished chip end facets; accurate positioning of the polished facet with respect to the end of the mode converter; specialty lensed fibers; and submicron alignment to the chip. Surface-emitting couplers allow flexibility in the location of the optical interface anywhere on the chip surface, not only near the chip edges. In addition, it has been demonstrated that these couplers can couple light to fibers in a near-normal orientation very efficiently, as illustrated by the fiber coupling shown in FIG. 3.

Figure 3:
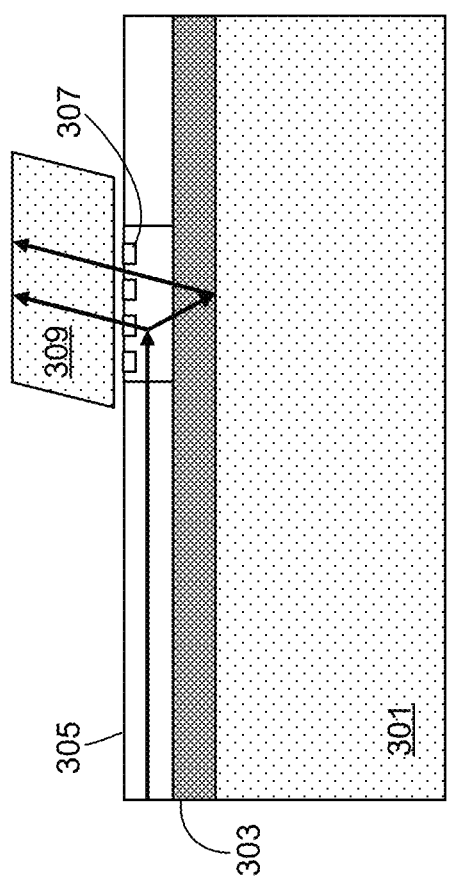
FIG. 3 is a schematic illustrating a grating coupler in a photonic chip, in accordance with an embodiment of the disclosure.

FIG. 3 is a schematic illustrating a grating coupler in a photonic chip, in accordance with an embodiment of the disclosure. Referring to FIG. 3, there is shown a chip 301 with vertical coupling of optical signals via a fiber 309. The grating structure 307 is embedded in a waveguide layer 305 and on a buried oxide 303, where the buried oxide layer 303 may comprise the oxide layer in a silicon-on-insulator (SOI) wafer.

FIG. 3 illustrates the operation of a grating coupler. A grating coupler typically couples light towards to the top of the chip for several reasons. The optical chip is usually mounted on a substrate and so the bottom side of the chip is not accessible for optical coupling. Furthermore, one must consider that high efficiency grating couplers couple light efficiently to a fiber in the near field only, that is, at less than about 50 μm optical distance (in air) from the grating. As the chip substrate thickness is typically on the order of 700 μm, it is impractical to couple light through the silicon substrate of the chip to an optical element, such as a fiber.

Figure 4A:
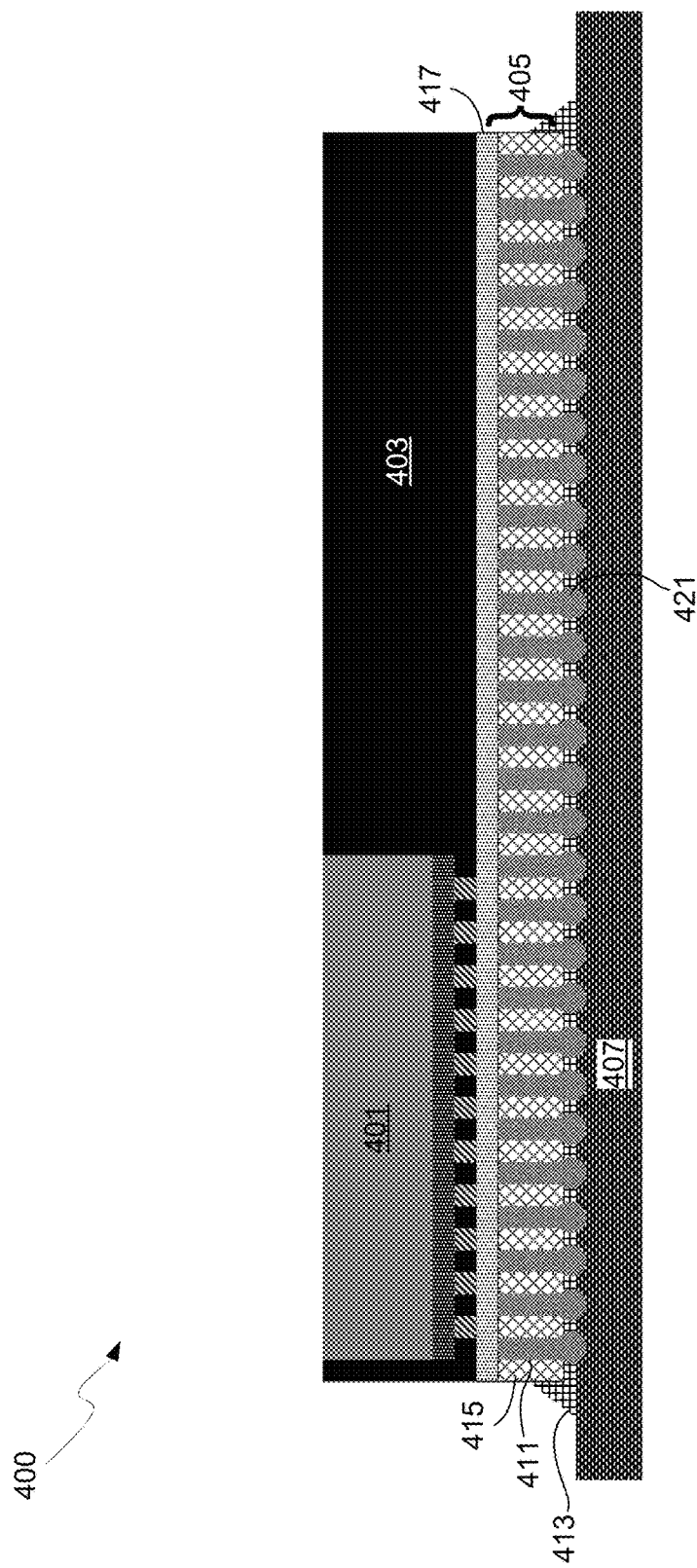
FIG. 4A illustrates an optoelectronic transceiver molded package, in accordance with an example embodiment of the disclosure.

FIG. 4A illustrates an optoelectronic transceiver molded package, in accordance with an example embodiment of the disclosure. Referring to FIG. 4A, there is shown molded package 400 comprising an electronics die 401, mold compound 403, photonic interposer 405, underfill 413, and a substrate 407. The photonic interposer 405 may comprise a photonics layer 417, a silicon layer 415, and TSVs 411 through the silicon layer 415. The photonics layer 417 may comprise optical and optoelectronic devices as described in FIG. 1, for example, such as grating couplers, waveguides, photodetectors, directional couplers, and modulators.

Microbumps 421, such as C4 microbumps, may be formed on the TSVs 411 for coupling the photonic interposer 405 to the substrate 407. The underfill 413 may comprise a non-conductive paste, for example, that may fill the volume between the photonic interposer 405 and the substrate 407, other than the volume taken by the microbumps 421.

As the mold compound 403 is not optically transparent, it prevents optical signals from coupling to the photonic chip from the top. One solution is to use a spacer die (for instance a silicon dummy die) to keep the area above the grating couplers clear from the molding material. However, as the thickness of the spacer die is similar to that of the electronic IC, near-field coupling from the grating coupler to the optical fiber is not possible. For these reasons, efficient optical coupling is challenging for a chip assembly on a substrate.

Figure 4B:
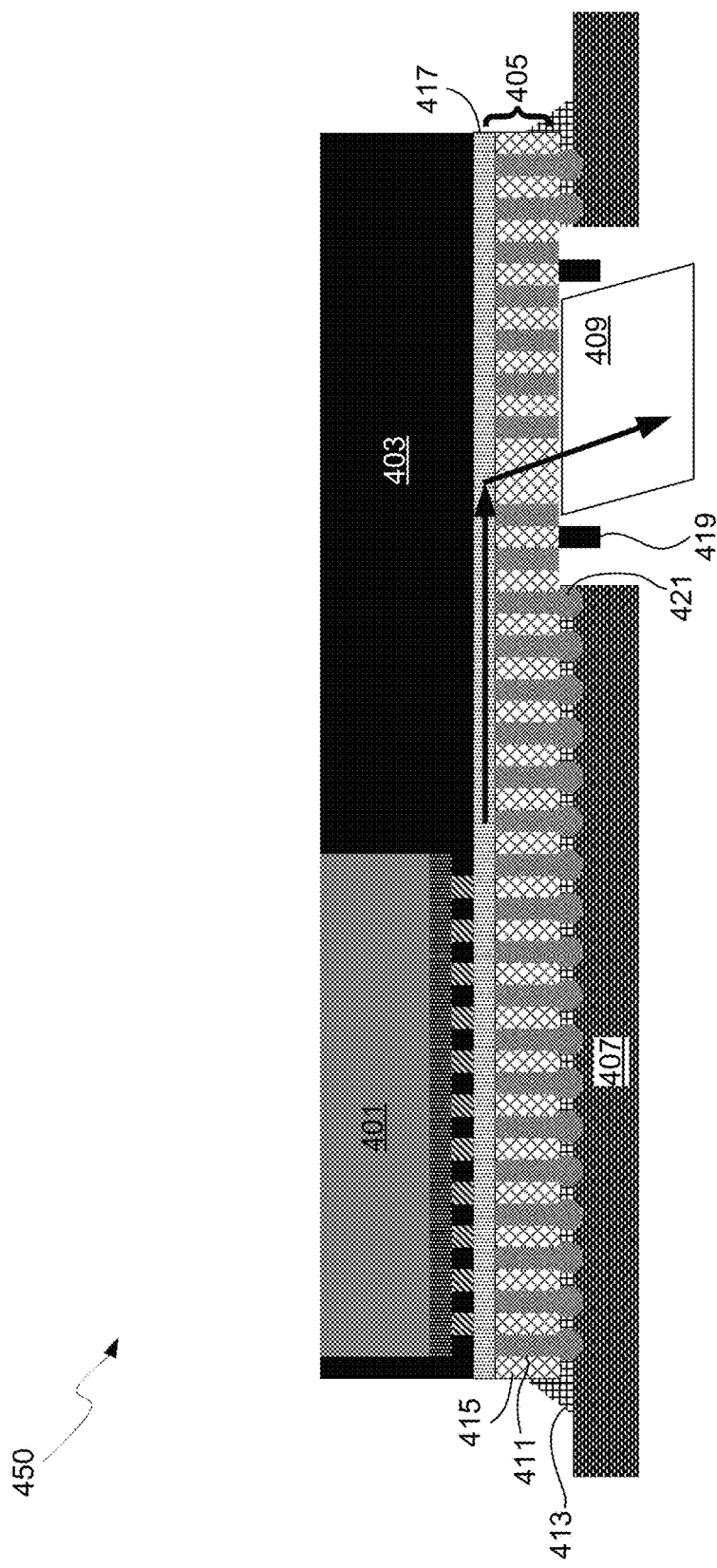
FIG. 4B illustrates an optoelectronic transceiver molded package with backside-coupled fiber, in accordance with an example embodiment of the disclosure.

FIG. 4B illustrates an optoelectronic transceiver molded package with backside-coupled fiber, in accordance with an example embodiment of the disclosure. Referring to FIG. 4B, there is shown molded package 450 comprising an electronics die 401, mold compound 403, photonic interposer 405, underfill 413, substrate 407, and a fiber 409. As with the structure in FIG. 4A, the photonic interposer 405 may comprise a photonics layer 417, a silicon layer 415, and TSVs 411 through the silicon layer 415. The photonics layer 417 may comprise optical and optoelectronic devices as described in FIG. 1, for example, such as grating couplers, waveguides, photodetectors, directional couplers, and modulators.

In the structure of FIG. 4B, the substrate 407 may comprise an opening through its thickness to the back surface of the photonic interposer 405 to allow direct contact by the optical fiber 409. In addition, a dam 419 may be formed around the fiber 409 to prevent underfill 413 from reaching the fiber 409.

The grating couplers in the photonic interposer can be designed to couple light towards the silicon substrate of the photonic interposer. If a small cavity is opened in the substrate on which the chip assembly sits, the optical fiber can be attached to the bottom of the interposer, as illustrated in FIG. 4B. The dam 419 may be added to surround the area for the light source and the fiber to prevent the C4 bump underfill 413 from entering those areas. This dam can be fabricated using, for instance, the solder used for the TSV bumps 421.

The thickness of the interposer substrate may be about 100 μm, which thickness corresponds to an optical path length of less than 30 μm in air, due to the high dielectric constant of silicon. Therefore this configuration enables near-field coupling from the fiber to grating couplers in the photonics layer 417 and vice versa.

Figure 5:
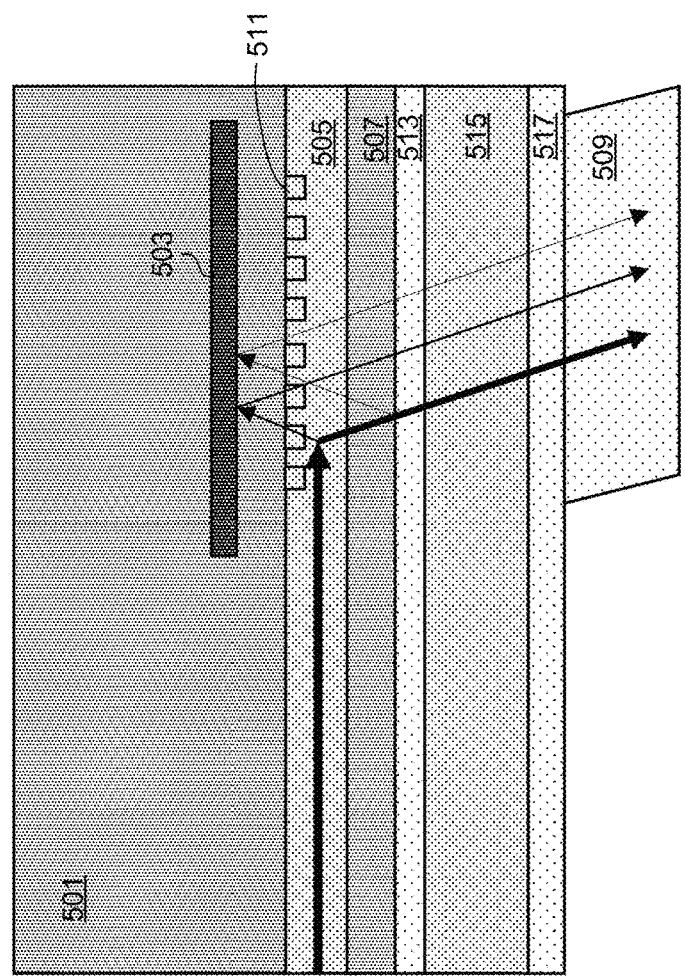
FIG. 5 illustrates a grating coupler for a fiber backside-coupled to a substrate, in accordance with an example embodiment of the disclosure.

FIG. 5 illustrates a grating coupler for a fiber backside-coupled to a substrate, in accordance with an example embodiment of the disclosure. Referring to FIG. 5, there is shown an interposer 500 comprising dielectric/metal back-end 501, a metal reflector 503, optical waveguide 505, buried oxide 507, optical fiber 509, a grating coupler 511, an anti-reflective coating 513, silicon substrate 515, and a second anti-reflective coating 517.

To achieve efficient optical coupling towards the substrate, several techniques may be employed in the design of the grating coupler on the photonic interposer. The following parameters may be optimized to achieve high directivity of the light signal towards the substrate: size of the etched features in the grating 511, pitch, or periodicity, of the grating 511, the thickness of the thin film layer, the waveguide layer 505, into which the grating are etched, the depth of the etch defining the grating, the thickness of the buried oxide 507 between the thin film active silicon layer 505 and the silicon handle substrate 515.

This thickness of the silicon substrate 515 may be chosen such that the light reflected from the oxide-handle interface is out of phase with the light scattered directly from the grating, thus partially canceling the light signal that is directed away from the substrate. In addition, a metal layer 503 can be added above the grating coupler 511 in the photonic interposer 500 that acts as a mirror, directing light downwards.

Anti-reflection coating 513 may be included between the buried oxide 507 and the silicon substrate 515 to reduce reflections. Additionally, an antireflection coating 517 may be applied to the bottom side of the silicon substrate 515 of the interposer 500 to moderate reflections from that interface. Also, alignment marks may be added on this surface to enable alignment of the fiber 509 to the grating coupler 511. The different improvements described here can be used either separately or together. Note that even though the grating coupler 511 is defined by a partial etch of the optical waveguide silicon layer 505 in the figure, the etch may be a full etch through the entire thickness of the thin film.

Figure 6A:
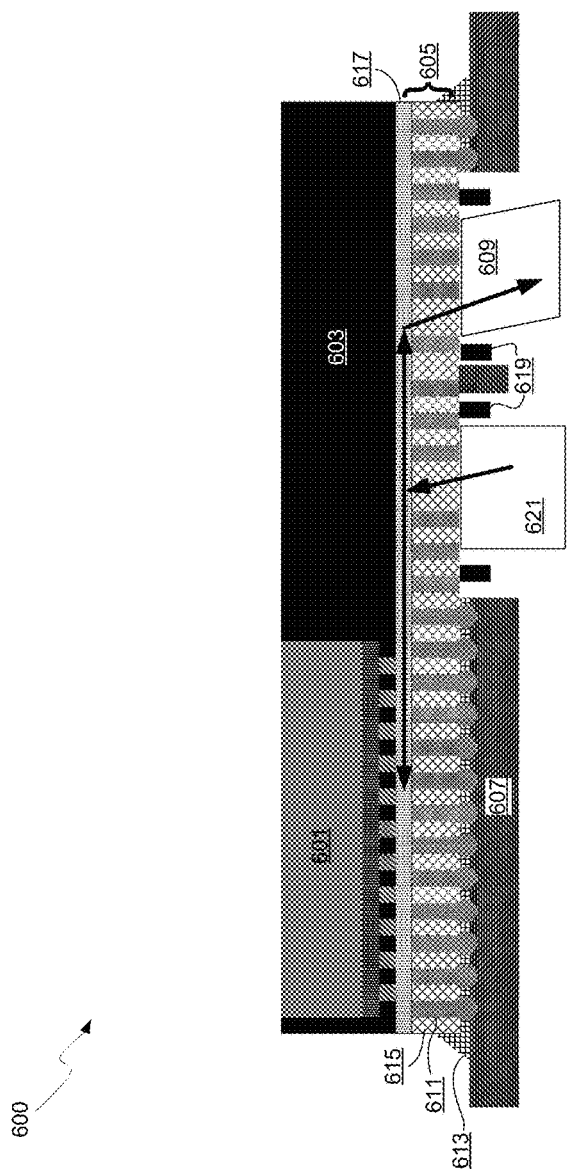
FIG. 6A illustrates an optoelectronic transceiver molded package with backside-coupled fiber and light source, in accordance with an example embodiment of the disclosure.

FIG. 6A illustrates an optoelectronic transceiver molded package with backside-coupled fiber and light source, in accordance with an example embodiment of the disclosure. Referring to FIG. 6A, there is shown molded package 600 comprising an electronics die 601, mold compound 603, photonic interposer 605, underfill 613, substrate 607, fiber 609, and light source assembly 621. The photonic interposer 605 may comprise a photonics layer 617, a silicon layer 615, and TSVs 611 through the silicon layer 615. The photonics layer 617 may comprise optical and optoelectronic devices as described in FIG. 1, for example, such as grating couplers, waveguides, photodetectors, directional couplers, and modulators. The light source assembly 621 may be similar to the light source assembly 101 or 209 in FIGS. 1 and 2A-2C, for example, and may comprise one or more laser diodes that provide CW optical signals to the optical and optoelectronic devices in the photonics layer 617.

As shown in FIG. 6A, a cavity may be formed in the substrate 607 to enable the coupling of the light source assembly 621 to the photonic interposer 605. In an example scenario, two separate cavities may be formed for the light source assembly 621 and the fiber 609, or a single larger cavity may be formed for both. In addition, dams 619 may be formed on the back surface of the photonic interposer 605 to block underfill material from contacting the optical fiber 609 or the light source assembly 621.

Figures 6B, 6C:
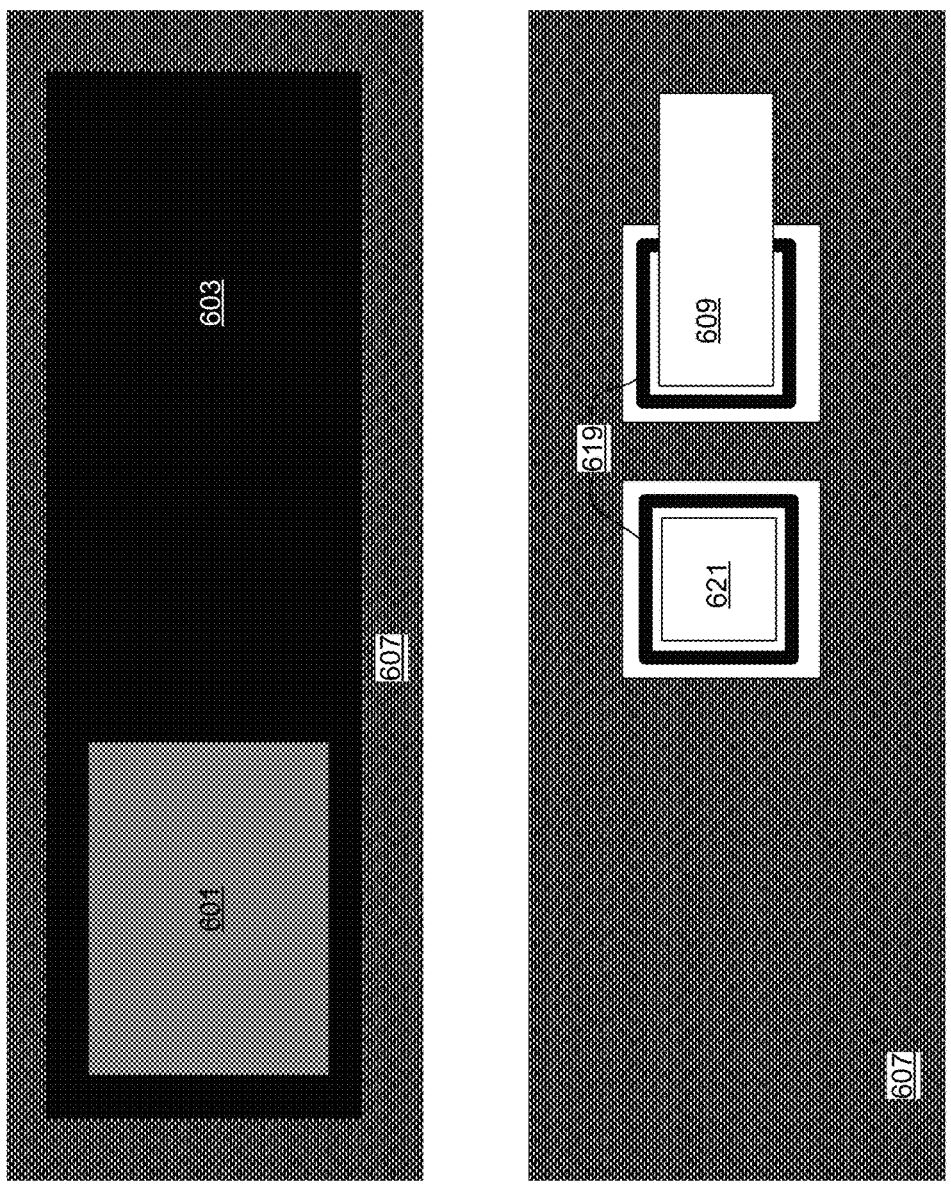
FIGS. 6B and 6C illustrate top and bottom views of a optoelectronic transceiver molded package, in accordance with an example embodiment of the disclosure.

FIGS. 6B and 6C illustrate top and bottom views of a optoelectronic transceiver molded package, in accordance with an example embodiment of the disclosure. Referring to FIG. 6B, there is shown a top view of the molded package 600, where the top surface of the die 601 is visible surrounded by the mold compound 603, which are on the substrate 607. The relative sizes of the die 601, the mold compound 603, and the substrate 607 are merely an example, and the molded portion of the package may instead be the same area as the substrate 607. In addition, the top surface of the die 601 is exposed to enable heat sinking out of the top surface, but instead may be covered by mold compound if desired for further mechanical protection of the die 601.

FIG. 6C illustrates the bottom view of the package 600, where the fiber 609 and light source assembly 621 coupled to the bottom surface of the substrate 607 are visible. In addition, the dams 619 are also visible in this view, which protect the fiber 609 and light source assembly 621 from underfill material.

Figure 7A:
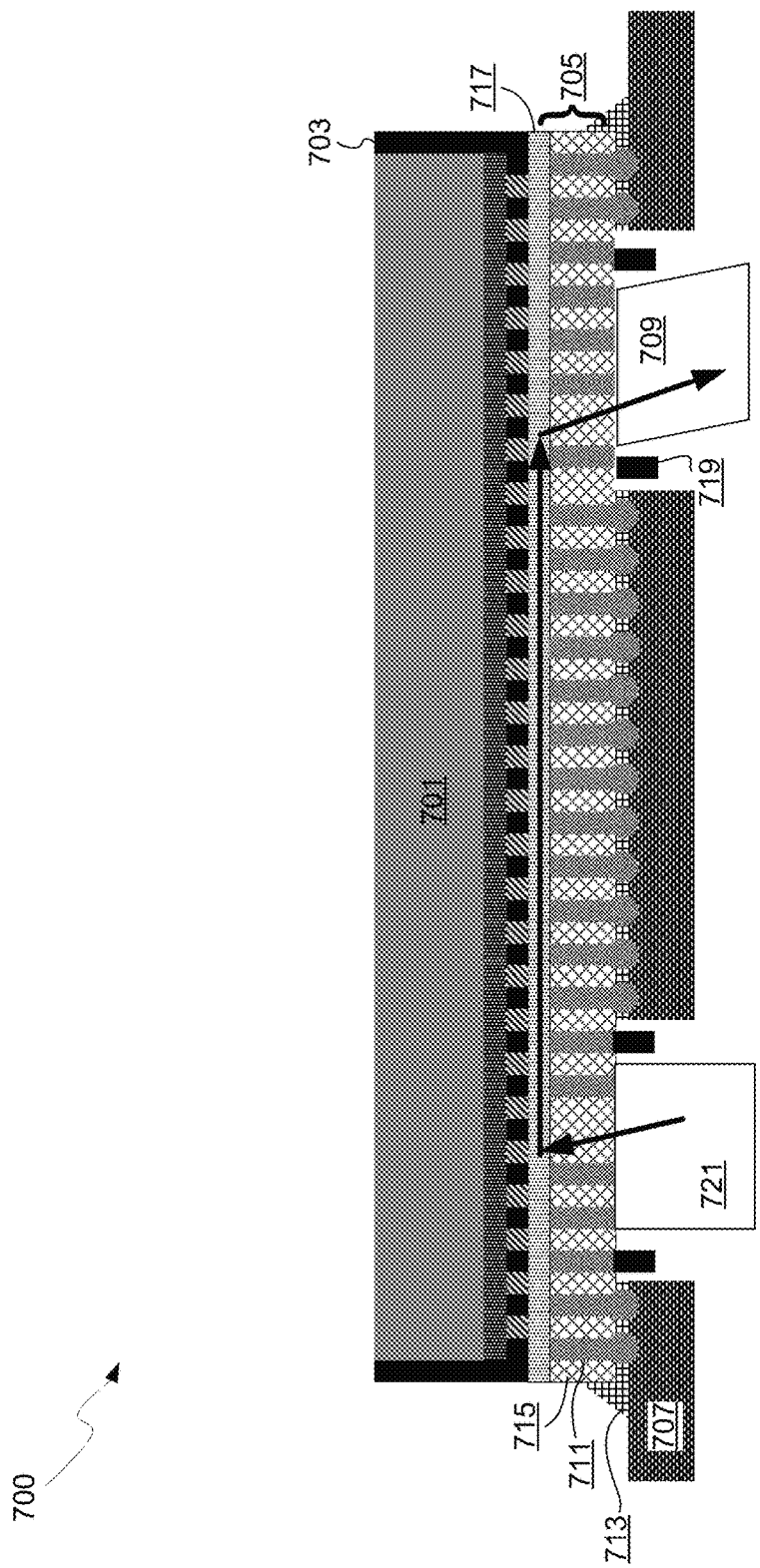
FIG. 7A illustrates another example optoelectronic transceiver molded package with backside-coupled fiber and light source, in accordance with an example embodiment of the disclosure.

FIG. 7A illustrates another example optoelectronic transceiver molded package with backside-coupled fiber and light source, in accordance with an example embodiment of the disclosure. Referring to FIG. 7A, there is shown molded package 700 comprising an electronics die 701, mold compound 703, photonic interposer 705, underfill 713, substrate 707, fiber 709, and light source assembly 721. The photonic interposer 705 may comprise a photonics layer 717, a silicon layer 715, and TSVs 711 through the silicon layer 715. The photonics layer 717 may comprise optical and optoelectronic devices as described in FIG. 1, for example, such as grating couplers, waveguides, photodetectors, directional couplers, and modulators. The light source assembly 721 may be similar to the light source assembly 101 or 209 in FIGS. 1 and 2A-2C, for example, and may comprise one or more laser diodes that provide CW optical signals to the optical and optoelectronic devices in the photonics layer 717.

As shown in FIG. 7A, cavities may be formed in the substrate 707 to enable the coupling of the light source assembly 721 and the optical fiber 709 to the photonic interposer 705. In an example scenario, two separate cavities may be formed for the light source assembly 721 and the fiber 709, or a single larger cavity may be formed for both. In addition, dams 719 may be formed on the back surface of the photonic interposer 705 to block underfill material from contacting the optical fiber 709 or the light source assembly 721. In this example, the electronics die 701 takes up most of the area of the top surface of the substrate 707, so there is only a thin strip of mold compound 703 around the die 701. Positioning the optical fiber 709 and the light source assembly 721 also allows integrating them directly opposite from the electronic die 701, which can reduce the size of the photonic interposer 705 as compared to the side-by-side alignment of FIGS. 6A-6C.

Figure 7B:
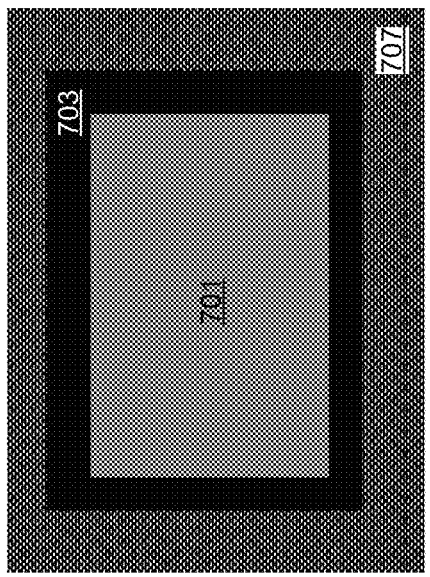
FIGS. 7B and 7C illustrate top and bottom views of the optoelectronic transceiver molded package of FIG. 7A, in accordance with an example embodiment of the disclosure.
Figure 7C:
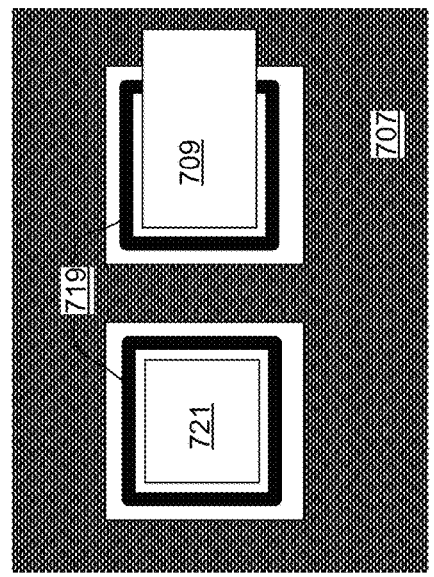

FIGS. 7B and 7C illustrate top and bottom views of the optoelectronic transceiver molded package of FIG. 7A, in accordance with an example embodiment of the disclosure. Referring to FIG. 7B, there is shown a top view of the molded package 700, where the top surface of the die 701 is visible taking up a large portion of the area of the substrate 707 surrounded by the mold compound 703, which are both on the substrate 707. The relative sizes of the die 701, the mold compound 703, and the substrate 707 are merely an example, and the molded portion of the package may instead be the same area as the substrate 707. In addition, the top surface of the die 701 is exposed to enable heat sinking out of the top surface, but instead may be covered by mold compound if desired for further mechanical protection of the die 701.

FIG. 7C illustrates the bottom view of the package 700, where the fiber 609 and light source assembly 721 coupled to the bottom surface of the substrate 607 are visible. In addition, the dams 719 are also visible in this view, which protect the fiber 709 and light source assembly 721 from underfill material.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
   in an integrated optical communication system comprising:
   an electronics die bonded to a first surface of a photonic interposer; and
   a substrate coupled to a second surface of said photonic interposer opposite to said first surface, wherein an optical fiber and a light source assembly are coupled to said second surface of said interposer in one or more cavities formed in the substrate:
   receiving a continuous wave (CW) optical signal in said photonic interposer from said light source assembly; and
   communicating a modulated optical signal to said optical fiber from said photonic interposer.

2. The method according to claim 1, wherein a mold compound is on said first surface of said photonic interposer and in contact with said electronics die.

3. The method according to claim 1, comprising coupling said received CW optical signal to an optical waveguide in said photonic interposer using a grating coupler.

4. The method according to claim 3, wherein a dielectric/metal backend is on said first surface of said photonic interposer.

5. The method according to claim 4, wherein a metal reflector is in said dielectric/metal backend and reflects light back into said grating coupler.

6. The method according to claim 3, wherein one or more anti-reflection coatings is between said optical fiber and said grating coupler.

7. The method according to claim 1, wherein said photonic interposer comprises through-silicon-vias (TSVs) that electrically couple said electronics die to said substrate.

8. The method according to claim 1, wherein said substrate comprises a printed circuit board.

9. The method according to claim 1, wherein dams are adjacent to said optical fiber and said light source assembly on said second surface of said photonic interposer.

10. The method according to claim 1, comprising generating said modulated optical signal utilizing a modulator in said photonic interposer and said received CW optical signal.

11. A system for communication, the system comprising:
   an integrated optical communication system comprising:
      an electronics die bonded to a first surface of a photonic interposer; and
      substrate coupled to a second surface of said photonic interposer opposite to said first surface, wherein an optical fiber and a light source assembly are coupled to said second surface of said photonic interposer in one or more cavities formed in said substrate,
   said integrated optical communication system being operable to:
      receive a continuous wave (CW) optical signal in said photonic interposer from said light source assembly; and
      communicate a modulated optical signal to said optical fiber from said photonic interposer.

12. The system according to claim 11, wherein a mold compound is on said first surface of said photonic interposer and in contact with said electronics die.

13. The system according to claim 11, wherein said integrated optical communication system is operable to couple said received CW optical signal to an optical waveguide in said photonic interposer using a grating coupler.

14. The system according to claim 13, wherein a dielectric/metal backend is on said first surface of said photonic interposer.

15. The system according to claim 14, wherein a metal reflector is in said dielectric/metal backend and reflects light back into said grating coupler.

16. The system according to claim 13, wherein one or more anti-reflection coatings is between said optical fiber and said grating coupler.

17. The system according to claim 11, wherein said photonic interposer comprises through-silicon-vias (TSVs) that electrically couple said electronics die to said substrate.

18. The system according to claim 11, wherein said substrate comprises a printed circuit board.

19. The system according to claim 11, wherein dams are adjacent to said optical fiber and said light source assembly on said second surface of said photonic interposer.

20. A system for communication, the system comprising:
   an integrated receiver comprising:
      an electronics die bonded to a first surface of a photonic interposer; and
      a substrate coupled to a second surface of the photonic interposer opposite to the first surface, wherein an optical fiber and a light source assembly are coupled to said second surface of the photonic interposer in one or more cavities formed in the substrate,
   said receiver being operable to receive a modulated optical signal from said optical fiber via a grating coupler in said photonic interposer.

* * * * *